United States Patent [19]
Utsui et al.

[11] Patent Number: 5,269,192
[45] Date of Patent: Dec. 14, 1993

[54] STRAIN DETECTOR

[75] Inventors: Yoshihiko Utsui; Hiromasa Ozawa; Hiroshi Sato, all of Hyogo, Japan

[73] Assignee: Mitsubishi Denki K.K., Tokyo, Japan

[21] Appl. No.: 713,474

[22] Filed: Jun. 11, 1991

[30] Foreign Application Priority Data

Jun. 20, 1990 [JP] Japan .................................. 2-163213
Jun. 20, 1990 [JP] Japan .................................. 2-163214

[51] Int. Cl.$^5$ ................................................ G01L 3/10
[52] U.S. Cl. ............................. 73/862.335; 73/862.333
[58] Field of Search ........ 73/862.36, 862.334–862.336

[56] References Cited

U.S. PATENT DOCUMENTS

| | | | |
|---|---|---|---|
| 4,306,462 | 12/1981 | Meixner | 73/862.36 |
| 4,765,192 | 8/1988 | Hase et al. | 73/862.36 |
| 5,022,275 | 6/1991 | Satoh et al. | 73/862.36 |

Primary Examiner—Richard E. Chilcot, Jr.
Assistant Examiner—R. Biegel
Attorney, Agent, or Firm—Sughrue, Mion, Zinn, Macpeak & Seas

[57] ABSTRACT

A strain detector to be attached to the shafts of devices such as engines, motors, electromagnetic clutches. First and second magnetic layers are disposed on the driven shaft so as to change permeability with a mechanical strain in the shaft. First and second detecting coils are wound around the first and second magnetic layers so as to be in a noncontact state therewith. Detecting means detects outputs of the detecting coils corresponding to the change in permeability. Furthermore, the driven shaft includes a heat conductive means with conductivity which is high enough to allow a temperature of each of said magnetic layers to be uniform. The outputs of the first and second detecting coils are detected in synchronism with both positive and negative drive timings of the AC drive circuit for applying an AC voltage to each of the detecting coils and smoothed and amplified thereafter, thereby allowing two strain detection outputs to be produced.

9 Claims, 11 Drawing Sheets

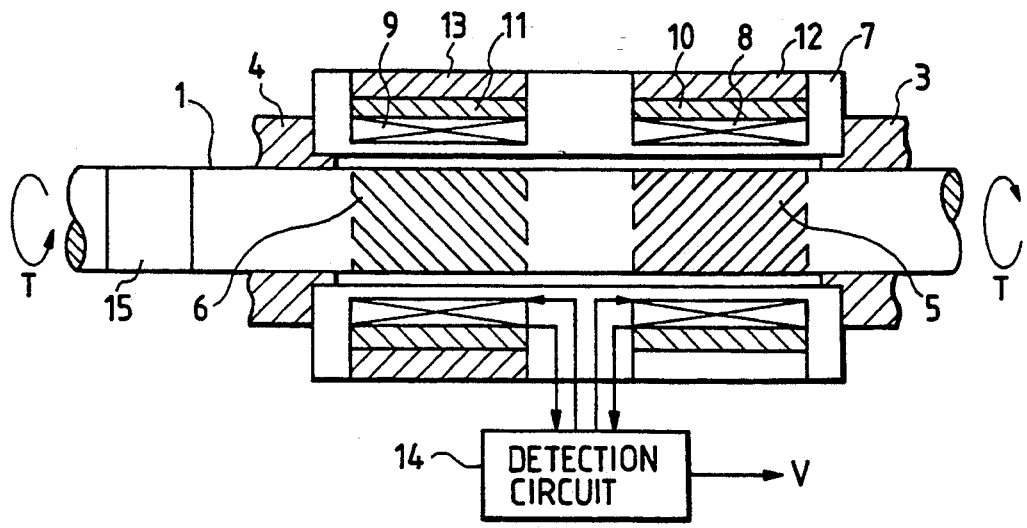
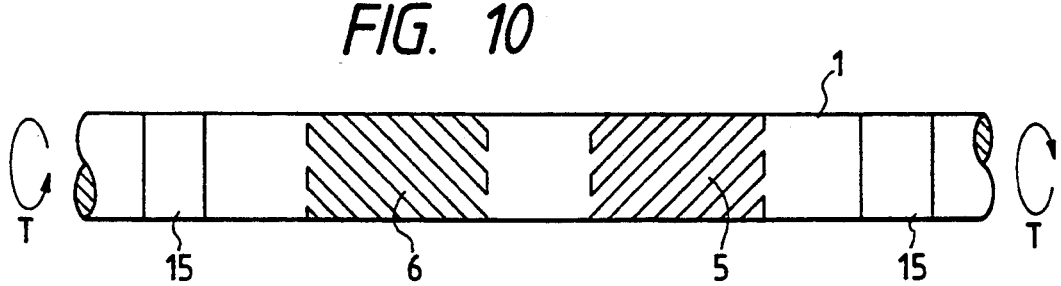
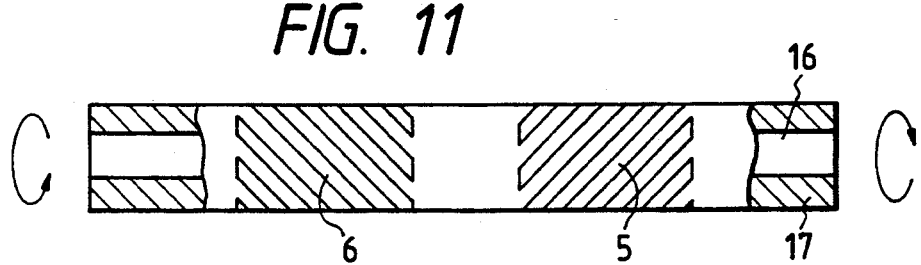
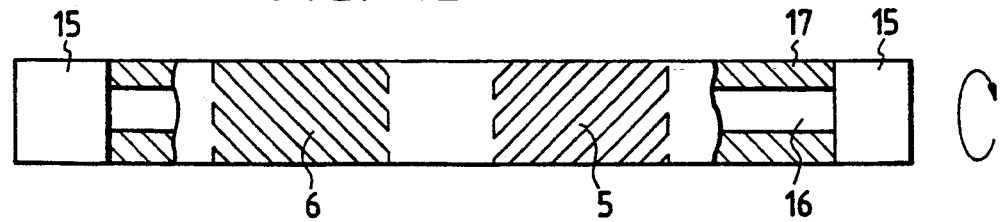

STRAIN DETECTOR

BACKGROUND OF THE INVENTION

The invention relates to a strain detector to be attached to the shafts of devices such as engines, motors, or electromagnetic clutches.

FIG. 1 shows an exemplary construction of a conventional strain detector. Reference numeral 1 designates a driven shaft which is a rotating shaft; 2, the axis of rotation of the driven shaft 1; and 3, 4, bearings for rotatably supporting the driven shaft 1.

On the outer peripheral surface of the driven shaft 1 are magnetic layers 5, 6 having a high permeability and being firmly fixed of the driven shaft so as to be spaced apart from each other along the axial direction of the driven shaft. The magnetic layer 5 is arranged so that a plurality of narrow, long strands extend at an angle of +45 degrees with respect to the axis 2, while the magnetic layer 6 is arranged so that a plurality of narrow, long strands extend at an angle of —45 degrees with respect to the axis 2. Around the outer peripheries of the magnetic layers 5, 6 is a cylindrical coil bobbin 7 arranged so as to be concentric with the driven shaft 1. Around the outer peripheral surface of the coil bobbin 7 are detecting coils 8, 9 wound so as to be in opposition to the magnetic layers 5, 6, respectively. The detecting coils 8, 9 are connected to a detection circuit 14. Reference numerals 10, 11 designate magnetic converging layers arranged around the detecting coils 8, 9. These magnetic converging layers are made of a soft magnetic material having a high permeability such as an amorphous alloy or a silicon steel strip. Reference numerals 12, 13 designate metallic yoke layers arranged around the magnetic converging layers 10, 11, respectively. These metallic yoke layers are made of a nonmagnetic and highly conductive material such as copper or aluminum and formed into a cylinder-like profile.

When a torque is applied to the driven shaft 1 from outside, a tensile force is generated at one of the magnetic layers 5, 6 and a compressive force, at the other, thus leaving the shaft 1 under strain. Such a strain then causes the permeability of each magnetic layer 5, 6 to change. The tensile force and the compressive force act to change each permeability in directions which are opposite to each other.

Since each magnetic converging layer 10, 11 is highly permeable and has a small magnetic resistance, the magnetic flux density of each magnetic layer 5, 6 is increased, improving not only the sensitivity but also the resistance to externally-induced noise with suppressed expansion of the magnetic flux. Each metallic yoke layer 12, 13 that is nonmagnetic and highly conductive has a small depth of penetration of magnetic flux due to its skin effect and this better confines the magnetic flux, thus leading to improvements in the sensitivity and noise resistance.

FIG. 2 shows an exemplary configuration of a detection circuit utilized in the above type of strain detector (Japanese Patent Unexamined Publication No. 154128/1990; Date of Publication: on Jun. 13, 1990). In FIG. 2, reference numeral 24 designates an output terminal of an intermediate potential of the detecting coils 8, 9 that are connected in series with each other; 27, an AC drive circuit for applying an AC voltage across the series-connected body of the detecting coils 8, 9; 25a, 25b, differential amplification circuits for detecting a potential difference between the terminals of the detecting coils 8, 9 with the voltage of the intermediate potential output terminal 24 as a reference voltage; 26, an addition circuit for adding an output of the differential amplification circuits 25a, 25b ; 28, a synchronized detection circuit for detecting an output of the addition circuit 26 base on a synchronized detection signal from the AC drive circuit 27; 29, a circuit for smoothing/amplifying/AC-DC converting a pulsating output signal of the synchronized detection circuit 28; and 30, an output terminal.

FIG. 3 shows a specific configuration of the AC drive circuit 27. In FIG. 3, reference characters $Q_1$ to $Q_4$ designate transistors; $V_0$ to $V_2$, an intermediate potential and a voltage across the series-connected body of the detecting coils 8, 9; and $S_1$ to $S_4$, timing signals for operating the transistors $Q_1$ to $Q_4$. FIG. 4 is a timing chart of the operation of the AC drive circuit 27. When $S_1$, $S_2$ are low and $S_3$, $S_4$ are high, $Q_1$, $Q_4$ are on, while $Q_2$, $Q_3$ are off. As a result, $V_1 = V_{cc}$ and $V_2 = 0$, which causes a positive current to flow through the detecting coils 8, 9. Conversely, when $S_1$, $S_2$ are high and $S_3$, $S_4$ are low, $Q_1$, $Q_4$ are off, while $Q_2$, $Q_3$ are on. As a result, a negative current flows through the detecting coils 8, 9.

FIG. 5 shows an exemplary configuration of the synchronized detection circuit 28. In FIG. 5, $Q_5$ designates a transistor; 42, an input terminal for receiving an output of the addition circuit 26; 43, an output terminal thereof; and 44, a resistor. FIG. 6 is a timing chart showing the operation of the synchronized detection circuit 28, of which part (a) shows a synchronized detection signal, which is received by the base of the transistor $Q_5$ from the AC drive circuit 27 and is out-of-phase with an AC drive signal applied from the AC drive circuit 27 by a predetermined degree; part (b) shows the waveform of an output from the addition circuit 26; part (c) shows the on-and-off operation of the transistor $Q_5$; and part (d) shows the waveform of an output from the output terminal 43. When the synchronized detection signal is high, the transistor $Q_5$ is turned on and no output signal of the addition circuit 26 is outputted from the output terminal 43. When the synchronized detection signal is low, the transistor $Q_5$ is turned off and an output of the addition circuit 26 is directly applied from the output terminal 43. The noise component in the output of the addition circuit 26 is thus removed by the synchronized detection circuit 28.

An operation of the circuits thus configured will be described next. The AC drive circuit 27 outputs an AC voltage and an AC current as shown in FIG. 4, and the output is applied across the series-connected body of the detecting coils 8, 9. Each detecting coil 8, 9 detects a change in the permeability of each magnetic layer 5, 6 as a change in its self-inductance. The output across each of the detecting coils 8, 9 is an induced voltage corresponding to the change in the self-inductance, and is applied to each of the differential amplification circuits 25a, 25b with the intermediate potential as a reference voltage, so that the difference between these applied induced voltages is amplified. The outputs of the differential amplification circuits 25a, 25b are added at the addition circuit 26 and detected thereafter at the synchronized detection circuit 28 by a synchronized detection signal that has been synchronized with one of the drive timings, either positive or negative, applied from the AC drive circuit 27 to remove the noise component. A signal pulsated by the synchronized detection circuit 28 is subjected to a smoothing and amplifying process by the AC-DC conversion circuit 29 and applied from the output terminal 30 as a strain detection signal.

Since the excitation and driving of the detecting coils 8, 9 and the detection of a change in the permeability of each magnetic layer 5, 6 are performed at different circuits in the aforesaid detection circuit, it is easy to make adjustments in circuit characteristics. In addition, the AC drive circuit 27 allows the drive current flow to be large in amplitude, which contributes to expanding the operating magnetic field region. As a result, the influence of an externally acting magnetic field can be reduced.

However, such a detection circuit effects its synchronized detection at only one timing, forward-driving or reverse-driving, of the AC drive circuit 27, and this disadvantageously causes the output of the synchronized detection circuit 28 to incorporate error components.

FIG. 7 shows a detection circuit in which the above problem has been overcome (Japanese Patent Unexamined Publication No. 271229/1990; Date of Publication: Nov. 6, 1990) In FIG. 7, reference numerals 28a, 28b designate synchronized detection circuits for detecting an output of the addition circuit 26 in synchronism with a synchronized detection signal. The synchronized detection circuit 28a detects the output with a first synchronized detection signal which is in synchronism with a positive drive timing of the AC drive circuit 27, while the synchronized detection circuit 28b detects the output with a second synchronized detection signal which is in synchronism with a negative timing of the AC drive circuit 27. The circuit configuration of each synchronized detection circuit 28a, 28b is the same as that of FIG. 5. Reference numeral 31 designates a differential amplification circuit which amplifies the difference between the outputs of the synchronized detection circuits 28a, 28b.

An operation of the detection circuits shown in FIG. 7 will be described with reference to a timing chart shown in FIG. 8. As shown by part (a) of FIG. 8, the AC drive circuit 27 outputs a drive voltage at drive timings, both positive and negative, while as shown by part (b) thereof, the addition circuit 26 outputs a strain component. The first synchronized detection signal is applied from the AC drive circuit 27 in synchronism with a positive drive timing as shown by part (c) of FIG. 8, and the second synchronized detection signal is applied from the AC drive circuit 27 in synchronism with a negative drive timing as shown by part (d) thereof. The synchronized detection circuits 28a, 28b output detection outputs shown by parts (e), (f) of FIG. 8 in accordance with the first and second synchronized detection signals. The differential amplification circuit 31 produces an output shown by part (g) of FIG. 8 while amplifying the difference between the applied outputs of the synchronized detection circuits 28a, 28b. The output from the differential amplification circuit 31 is then smoothed and amplified by the AC-DC conversion circuit 29 and applied from the output terminal 30 as a strain detection signal.

In the detection circuits shown in FIG. 7, the strain-based outputs are detected at both positive and negative drive timings of the AC drive circuit 27, and the difference between the detected outputs is amplified, thereby canceling the error components out. As a result, not only can the strain detection accuracy be improved, but also the influence of an externally applied magnetic field can be canceled out.

The aforesaid strain detector is attached to a device such as an engine, a motor, or an electromagnetic clutch to control its transmitted torque or the like. However, the engine or the like generates heat and the generated heat is transmitted to the detector through the driven shaft 1 that is connected thereto, providing a temperature gradient with the driven shaft 1. This further generates a difference in the temperature between the magnetic layers 5, 6, leading to a difference in permeability. As a result, the detection values incorporate heat-induced errors.

Further, each of the aforesaid detection circuits produces only one output, and this has hampered detection of abnormality caused by, e.g., heat. The detecting coils 8, 9 are connected in series with each other to divide the power voltage by their inductances and internal resistances. As a result, the output of each of the detecting coils 8, 9 includes the inductance of the other no matter how it is post-processed. Inability of measuring the behaviors of the detecting coils independently of each other does not allow a change in the inductance due to application of an external force to be separated from a change in the inductance due abnormalities of the magnetic layers 5, 6 or the like. As a result, abnormalities in the magnetic layers 5, 6 and the detection circuits cannot be detected, which is another disadvantage.

SUMMARY OF THE INVENTION

The invention has been made to overcome the above circumstances. Accordingly, an object of the invention is to provide a strain detector capable not only of removing errors due to heat, transmitted from an object to be detected, but also of detecting abnormalities of the magnetic layers and the detection circuits easily.

To achieve the above object, the invention is applied to a strain detector which includes: a driven shaft to which an external force is applied; first and second magnetic layers, each of which is disposed on the driven shaft and changes its permeability by a strain; first and second detecting coils, wound around the first and second magnetic layers in noncontact state, respectively; and detecting means for detecting outputs of the detecting coils as strain signals upon reception of the outputs, each of the outputs corresponding to a change in permeability.

The driven shaft includes a heat conductive means having such a high heat conductivity as to allow a temperature of each of the magnetic layers to be made uniform. Accordingly, when one end of the driven shaft is heated, the heat is transferred to the other end quickly, thereby eliminating temperature gradients over the driven shaft.

The stain detector of the invention may also have a detection means which includes: an AC drive circuit for applying an AC voltage across a body consisting of serially connected detecting coils; first and second synchronized detection circuits for detecting the outputs of the first and second detecting coils by first and second synchronized detection signals, the first and second synchronized detection signals being in synchronism with positive and negative drive timings of the AC drive circuit, respectively; and first and second smoothing/amplification circuits for smoothing and amplifying the outputs of the first and second synchronized detection circuits, respectively.

Another strain detector of the invention may be constructed such that, when no external stress is being applied to each of the first and second magnetic layers, the permeability of each magnetic layer is set to the maximum, and that the detecting means includes: an AC drive circuit for applying an AC voltage to a body consisting of parallel connected detecting coils; first and second synchronized detection circuits for detecting the outputs of the first and second detecting coils by first and second synchronized detection signals, the first and second synchronized detection signals being in synchronism with positive and negative drive timings of the AC drive circuit, respectively; and first and second smoothing/amplification circuits for smoothing and amplifying outputs of the first and second synchronized detection circuits, respectively.

According to the thus configured detection means, the outputs of the first and second detecting coils are detected in synchronism with both positive and negative drive timings of the AC drive circuit and smoothed and amplified thereafter, thereby allowing two strain detection outputs to be produced.

Further, if each magnetic layer is set to the maximum permeability with no external stress being applied thereto, each magnetic layer becomes only sensitive to either a tensile stress or a compressive stress, causing only one of the two outputs to be changed. An AC voltage is applied to the body consisting of parallel connected detecting coils, thus not contaminating the inductance of one of the outputs with that of the other.

Furthermore, as described above, the occurrence of abnormalities can be detected should a temperature difference arise between the magnetic layers.

BRIEF DESCRIPTION OF THE DRAWINGS

FIGS. 9 and 10 are a diagram showing a strain detector, which is a second embodiment of the invention, and a front view of a driven shaft thereof;

FIGS. 11 to 13 are partially cutaway front views showing driven shafts of strain detectors, which are third to fifth embodiments of the invention;

DETAILED DESCRIPTION OF THE PREFERRED EMBODIMENTS

Figure 1:
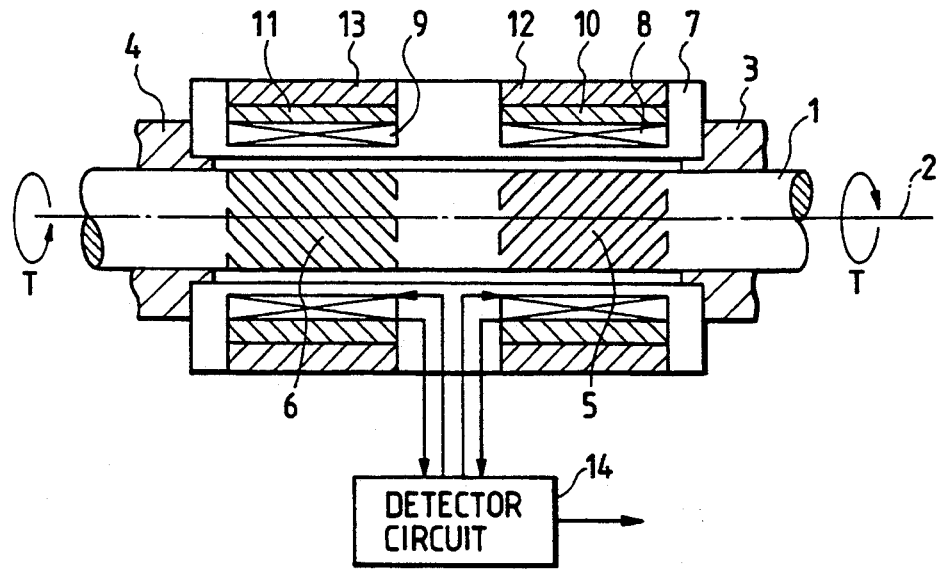
FIG. 1 is a diagram showing a construction of both a conventional strain detector and a strain detector, which is a first embodiment of the invention.
Figure 2:
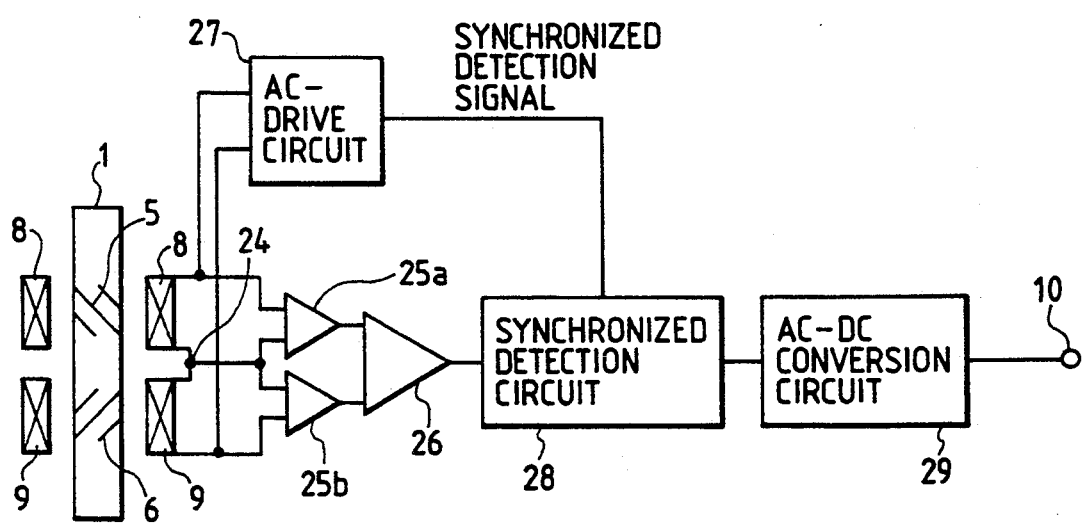
FIGS. 2 and 7 are diagrams showing configurations of the conventional strain detectors.
Figure 3:
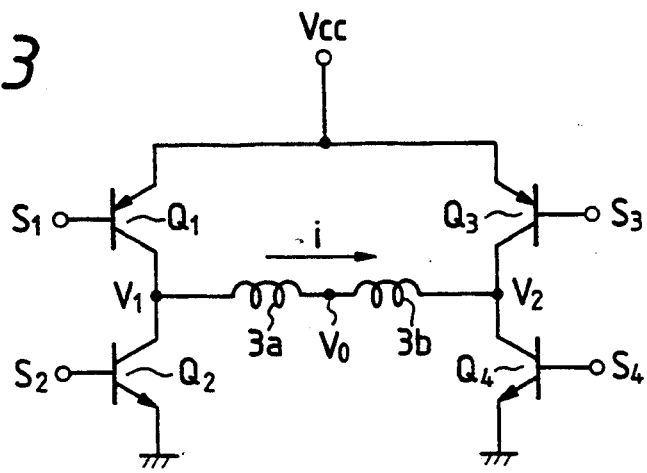
FIGS. 3 and 4 are a circuit diagram and a waveform diagram of an AC drive circuit.
Figure 4:
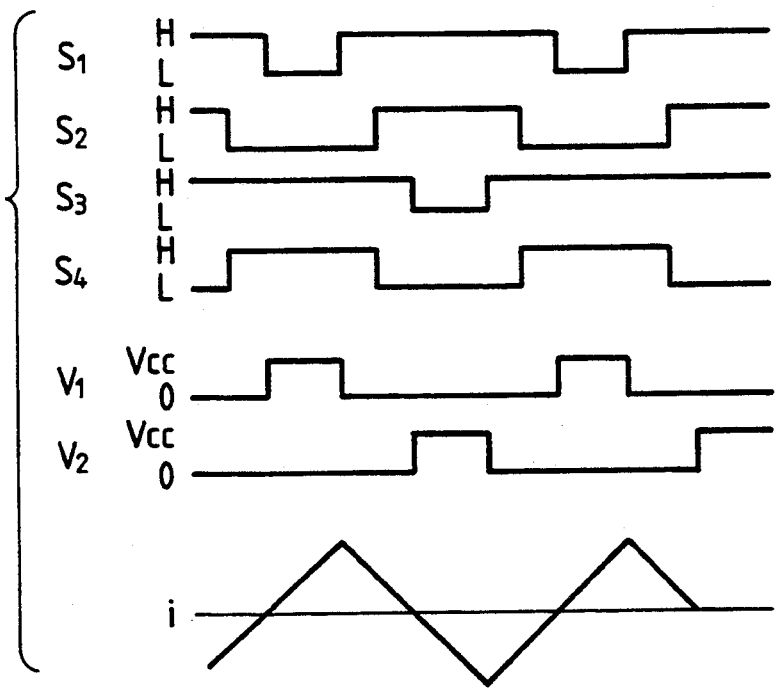
Figure 5:
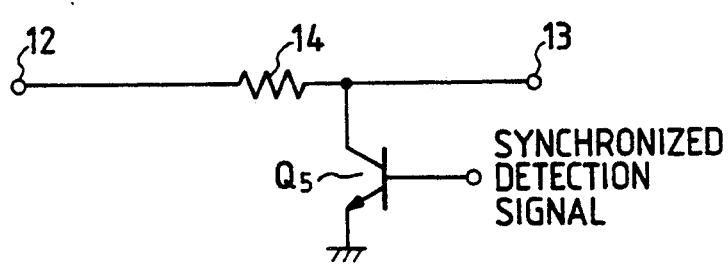
FIG. 5 is a circuit diagram of a synchronized detection circuit.
Figure 6:
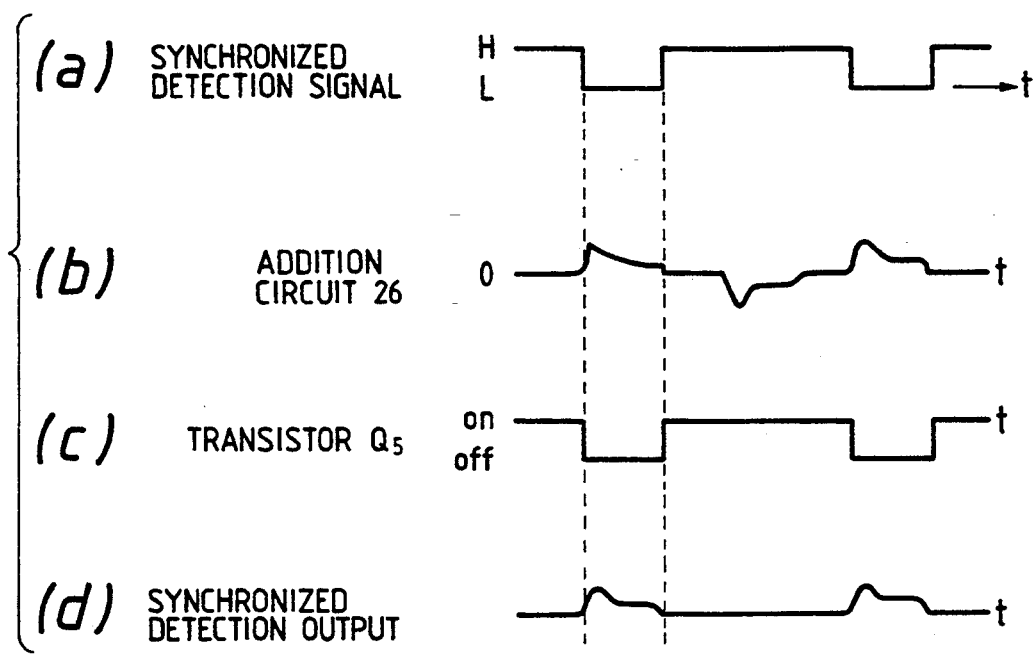
FIGS. 6 (a) to (d) are waveform diagrams conventional synchronized detection circuit when this circuit is operated.

Embodiments of the invention will be described with reference to the accompanying drawings. The construction of a strain detector, which is a first embodiment of the invention, is the same as that shown in FIG. 1 except for the material of a driven shaft 1. Specifically, in the first embodiment, the driven shaft 1 is made of a highly heat conductive material such as copper or nickel. When part of the driven shaft 1 is heated by heat transferred from an end or other part thereof, the driven shaft 1, because of its high heat conductivity, propagates the heat over the entire part thereof. As a result, no temperature gradient exists between the magnetic layers 5, 6 that are firmly fixed onto the driven shaft 1, thus eliminating heat-induced strain detection error.

FIGS. 9 and 10 show a second embodiment of the invention. In the second embodiment, driven shaft 1 is made of a highly heat conductive material and an end or both ends thereof which may be connected to a heat source are connected to a member 15 having a low heat conductivity made of, e.g., ceramic, by adhesion, copper-brazing, or the like. Thus, in this embodiment, the heat from the heat source is shielded by the low heat conductive member 15, either preventing the driven shaft 1 from being heated abruptly or allowing the driven shaft 1 to be heated abruptly over the entire part thereof if the heat has transferred therethrough. As a result, no temperature gradient develops between the magnetic layers 5, 6, thus there is no heat-induced strain detection error.

FIG. 11 shows a third embodiment of the invention. Since the driven shaft 1 is made of a highly heat conductive material such as copper or nickel in the aforesaid embodiments, the driven shaft 1 is poor in rigidity and may thus be broken when a large torque is applied thereto. To overcome this problem, a driven shaft 17 is made of a highly rigid material such as iron in the form of a pipe and a highly heat conductive shaft member 16 such as copper is inserted therein so as to be integral with the pipe member in the third embodiment. Thus the driven shaft 17 is not easily broken, nor does it cause heat-induced strain detection errors, because the temperature of the driven shaft 17 is uniform because the temperatures of the magnetic layers 5, 6 are likewise uniform with the shaft member 16 is made of a high heat conductive material.

FIG. 12 shows a fourth embodiment of the invention. In this embodiment, the low heat conductive members 15 are provided at both ends of each of the shaft member 16 and the driven shaft 17 of the third embodiment shown in FIG. 11 so that the combined advantages of the second and third embodiments can be provided therewith.

Figure 13:
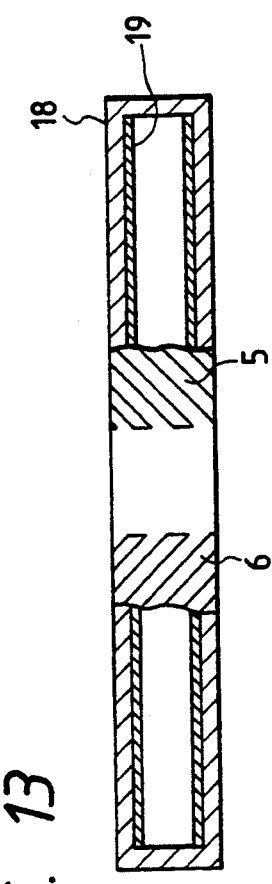

FIG. 13 shows a fifth embodiment of the invention. A driven shaft 18, which is hollow with both ends thereof closed, is not only provided with a wick 19 for circulating an operating fluid therethrough from a condensing unit (not shown) to an evaporating unit (not shown) by capillary action, but also loaded with the operating fluid. Specifically, the driven shaft 18 has a heat pipe structure, and when heat is applied to an end of the drive shaft 18 from a heat source, the operating fluid moves toward the other end thereof by endothermic evaporation, and subsequently becomes a fluid by exothermic condensation, and is circulated back into the one end by the capillary action of the wick 19. Accordingly the temperature of the driven shaft 18 is uniform, making the temperatures of the magnetic layers 5, 6 firmly fixed onto the driven shaft 18 likewise uniform and thus no heat-induced strain detector error is generated.

Figure 14:
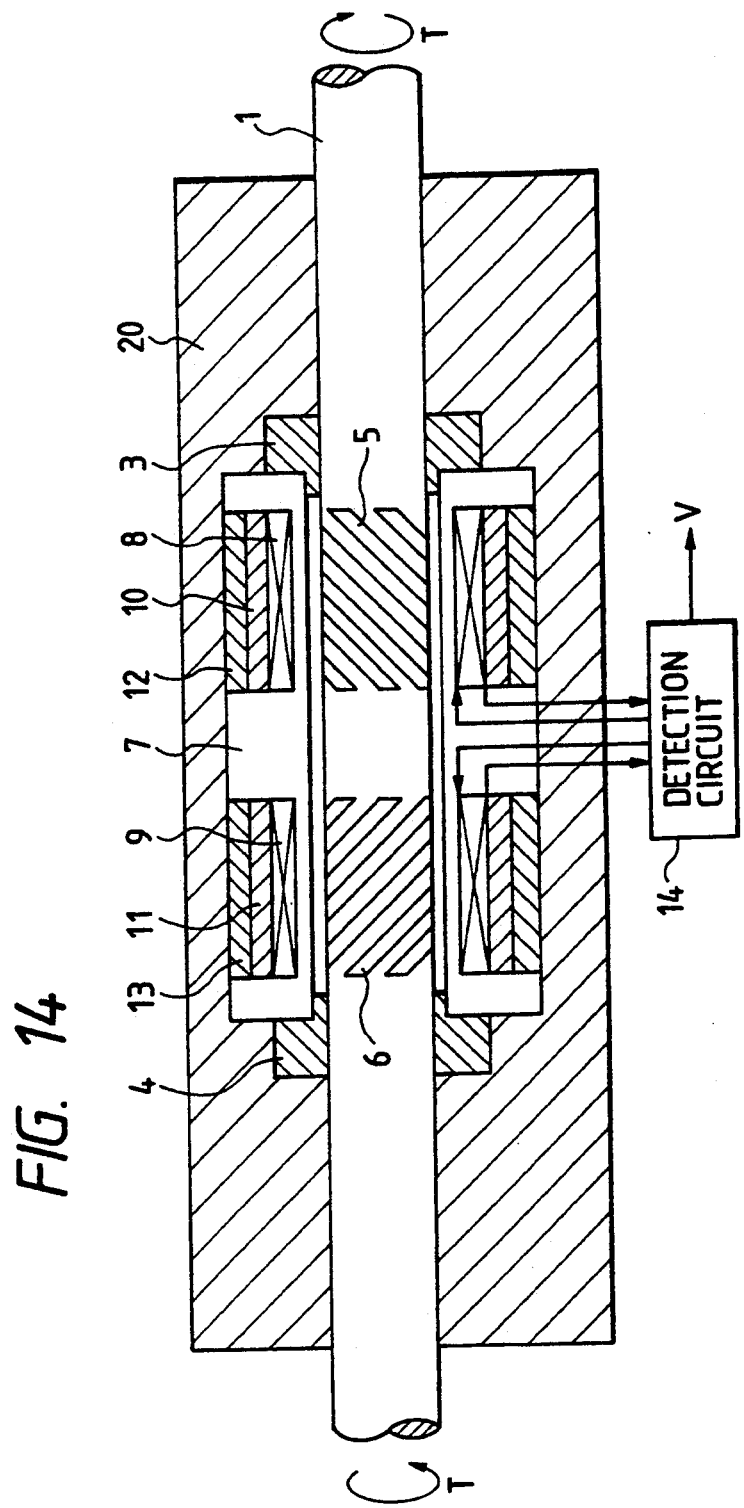
FIG. 14 is a diagram showing a construction of a strain detector, which is a sixth embodiment of the invention.

FIG. 14 shows a sixth embodiment of the invention. In this embodiment, the strain detector is entirely enclosed by a heat bypassing member 20, except for its detection circuit 14, and the driven shaft 1 is arranged to pass through the heat bypassing member 20. In this case, heat applied from an end of the drive shaft 1 is partially bypassed to the heat bypassing member 20. As a result, the magnetic layers 5, 6 are never heated suddenly but are heated gradually, thereby causing no heat-induced strain detection error. The driven shaft 1 may also be provided with a low heat conductive member 15 so as to facilitate the heat bypass process.

As described above, according to the invention, the driven shaft is provided with a highly heat conductive structure for making the temperatures of a pair of magnetic layers uniform. As a result of such a construction, no difference in permeability is observed between the magnetic layers due to a temperature difference therebetween, thereby preventing occurrence of strain detection errors.

Figure 15:
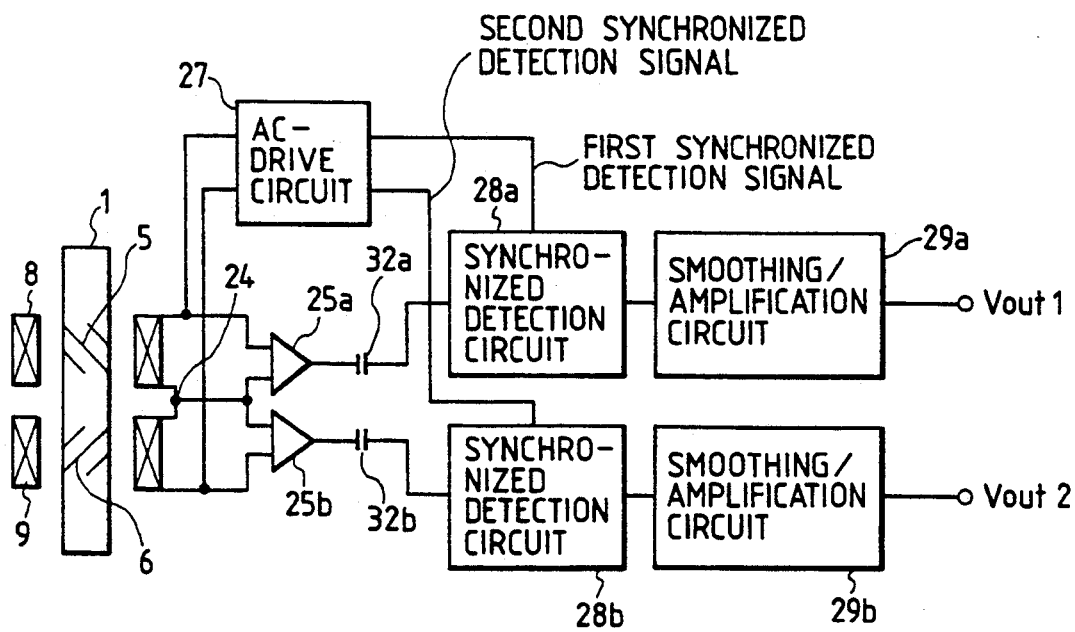
FIG. 15 is a diagram showing a configuration of a strain detector, which is a seventh embodiment of the invention.

FIG. 15 shows a configuration of the seventh embodiment. In FIG. 15, reference numerals 29a, 29b designate first and second smoothing/amplification circuits for smoothing and amplifying the outputs of the synchronized detection circuits 28a, 28b ; and 32a, 32b, capacitors inserted between the differential amplification circuits 25a, 25b and the synchronized detection circuits 28a, 28b. Other aspects of the seventh embodiment may be the same as those of the conventional strain detector.

An operation of the seventh embodiment will now be described. Assuming that the drive voltages of the AC drive circuit 27 are $V_a$, $V_b$ as shown in parts (a) and (b) of FIG. 16, a current i flowing through the coils 8, 9 during a time segment at which $V_a = V_{cc}$ becomes $$i = \frac{V_{cc}}{R}\left(1 - \frac{1 + e^{-\Delta tR/L}}{1 + e^{-\Delta t \cdot 2R/L}} \cdot e^{-tR/L}\right)$$

Where the inductances and internal resistances of the detecting coils 8, 9 and $L_1$, $L_2$ and $r_1$, $r_2$, respectively, and $L = L_1 + L_2$, $R = r_1 + r_2$. Assuming that the voltages generated at the detecting coils 8, 9, and $E_a$ and $E_b$, respectively, these voltages are given as $$E_a = \left(r_1 i + L_1 \frac{di}{dt}\right) =$$

$$\left(\frac{r_1}{R} + \frac{r_2 L_1 - r_1 L_2}{LR} \cdot \frac{1 + e^{-\Delta tR/L}}{1 + e^{-\Delta t \cdot 2R/L}} \cdot e^{-tR/L}\right) V_{cc}$$

-continued $$E_b = \left(r_2 i + L_2 \frac{di}{dt}\right) =$$

$$\left(-\frac{r_2}{R} + \frac{r_2 L_1 - r_1 L_2}{LR} \cdot \frac{1 + e^{-\Delta tR/L}}{1 + e^{-\Delta tR/L}} \cdot e^{-tR/L}\right) V_{cc}$$

Then, the values, i, $E_a$, and $E_b$, at a time segment at which $V_b = -V_{cc}$ become $$i = \frac{V_{cc}}{R}\left(1 - \frac{1 + e^{-\Delta tR/L}}{1 + e^{-\Delta t \cdot 2R/L}} \cdot e^{-tR/L}\right)$$

$$E_a = -\left(\frac{r_1}{R} + \frac{r_2 L_1 - r_1 L_2}{LR} \cdot \frac{1 + e^{-\Delta tR/L}}{1 + e^{-\Delta t \cdot 2R/L}} \cdot e^{-tR/L}\right) V_{cc}$$

$$E_b = -\left(-\frac{r_2}{R} + \frac{r_2 L_1 - r_1 L_2}{LR} \cdot \frac{1 + e^{-\Delta tR/L}}{1 + e^{-\Delta t \cdot 2R/L}} \cdot e^{-tR/L}\right) V_{cc}$$

Figure 16:
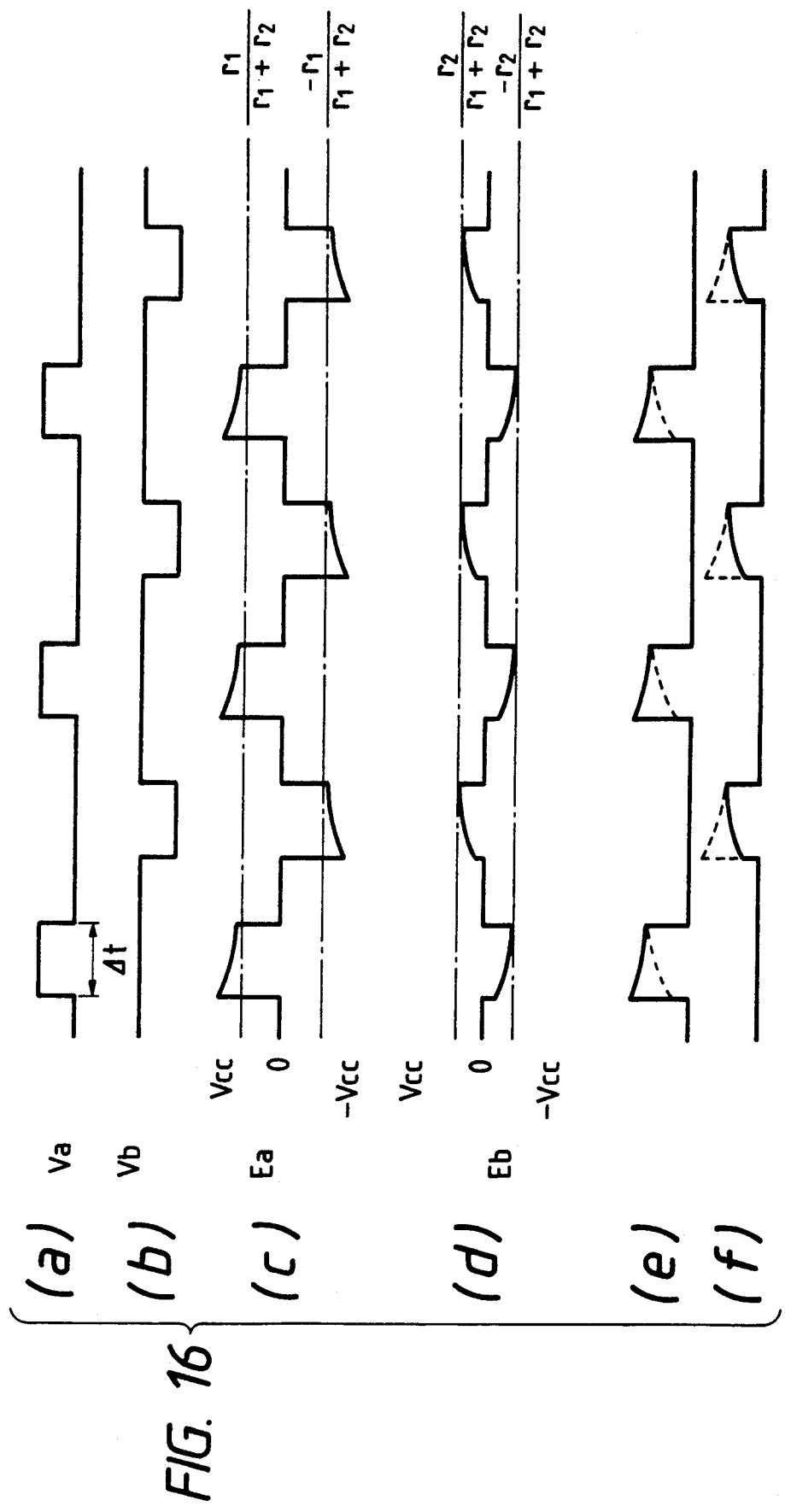

The waveforms of $E_a$, $E_b$ are shown by parts (c), (d) of FIG. 16.

These voltages $E_a$, $E_b$ are applied to the synchronized detection circuits 28a, 28b and detected by the first and second synchronized detection signals which have been in synchronism with $V_a$, $V_b$ as $$E_a = V_{cc}\left(\frac{r_1}{R} + \frac{r_2 L_1 - r_1 L_2}{LR} \cdot \frac{1 + e^{-\Delta tR/L}}{1 + e^{-\Delta t \cdot 2R/L}} \cdot e^{-tR/L}\right)$$

$$E_b = V_{cc}\left(\frac{r_2}{R} - \frac{r_2 L_1 - r_1 L_2}{LR} \cdot \frac{1 + e^{-\Delta tR/L}}{1 + e^{-\Delta t \cdot 2R/L}} \cdot e^{-tR/L}\right)$$

Here, if it is assumed that $r = r_1 = r_2$ as an ideal state, then the detection outputs $E_a$, $E_b$ are expressed as $$E_a = V_{cc}\left(\frac{1}{2} + \frac{L_1 - L_2}{2(L_1 + L_2)} \cdot \frac{1 + e^{-\Delta t \cdot 2r/L}}{1 + e^{-\Delta t \cdot 2 \cdot 2r/L}} \cdot e^{-2r/L}\right) \quad (1)$$

$$E_b = V_{cc}\left(\frac{1}{2} - \frac{L_1 - L_2}{2(L_1 + L_2)} \cdot \frac{1 + e^{-\Delta t \cdot 2r/L}}{1 + e^{-\Delta t \cdot 2 \cdot 2r/L}} \cdot e^{-2r/L}\right) \quad (2)$$

Figure 17A:
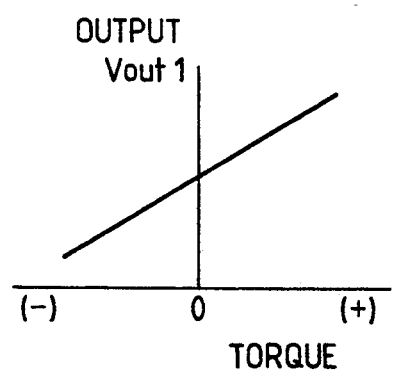
FIGS. 16 and 17 (a) and (b) are a waveform diagram and output characteristic diagrams of the seventh embodiment of the invention.
Figure 17B:
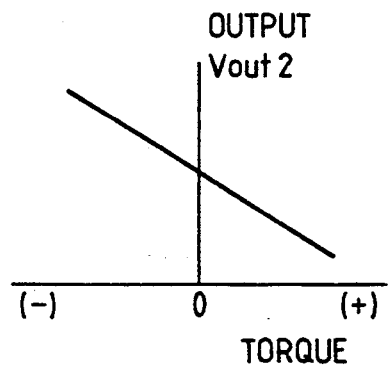

In the detection outputs shown in equations (1), (2), the difference between $L_1$ and $L_2$ is amplified with any thermal stress or bending stress which causes $L_1$ and $L_2$ to change in the same directions being canceled out. Here, if it is assumed that $L_1$ and $L_2$ have changed in the opposite direction ($L_1 = L_0 + \Delta L$, $L_2 = L_0 - \Delta L$) with the application of a torque, then equations (1), (2) can be rewritten as $$E_a = V_{cc}\left(\frac{1}{2} + \frac{\Delta L}{2L_o} \cdot \frac{1 + e^{-\Delta tr/L_o}}{1 + e^{-\Delta t \cdot 2r/L_o}} \cdot e^{-tr/L_o}\right) \quad (3)$$

$$E_b = V_{cc}\left(\frac{1}{2} - \frac{\Delta L}{2L_o} \cdot \frac{1 + e^{-\Delta tr/L_o}}{1 + e^{-\Delta t \cdot 2r/L_o}} \cdot e^{-tr/L_o}\right) \quad (4)$$

making the changes in Ea, Eb to be of opposite polarity to each other with respect to $\Delta L$. Therefore, the detection outputs are fed to the smoothing/amplification circuits 29a, 29b to be smoothed and amplified and outputted as outputs $V_{out}1$, $V_{out}2$. The outputs $V_{out}1$, $V_{out}2$ are of opposite polarity to each other with respect to an applied torque as shown in FIGS. 17 (a), (b). Thus, the two accurate outputs with their thermal or bending stress canceled out can be obtained. This also facilitates abnormality detection, because one of the outputs becomes abnormal should any circuit element other than the driven shaft 1 or the magnetic layers 5, 6 be defective.

Figure 7:
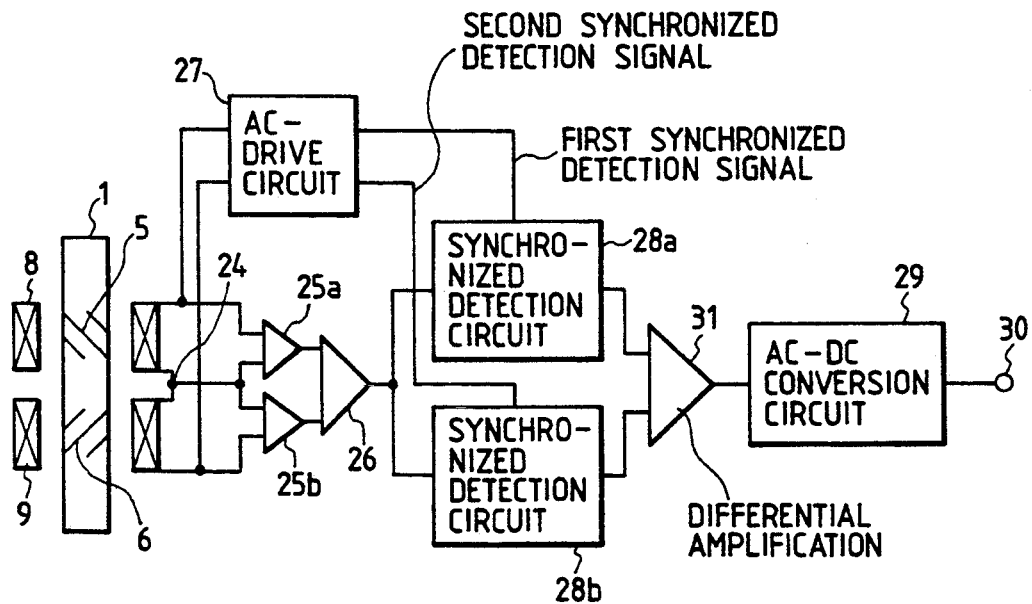
Figure 8:
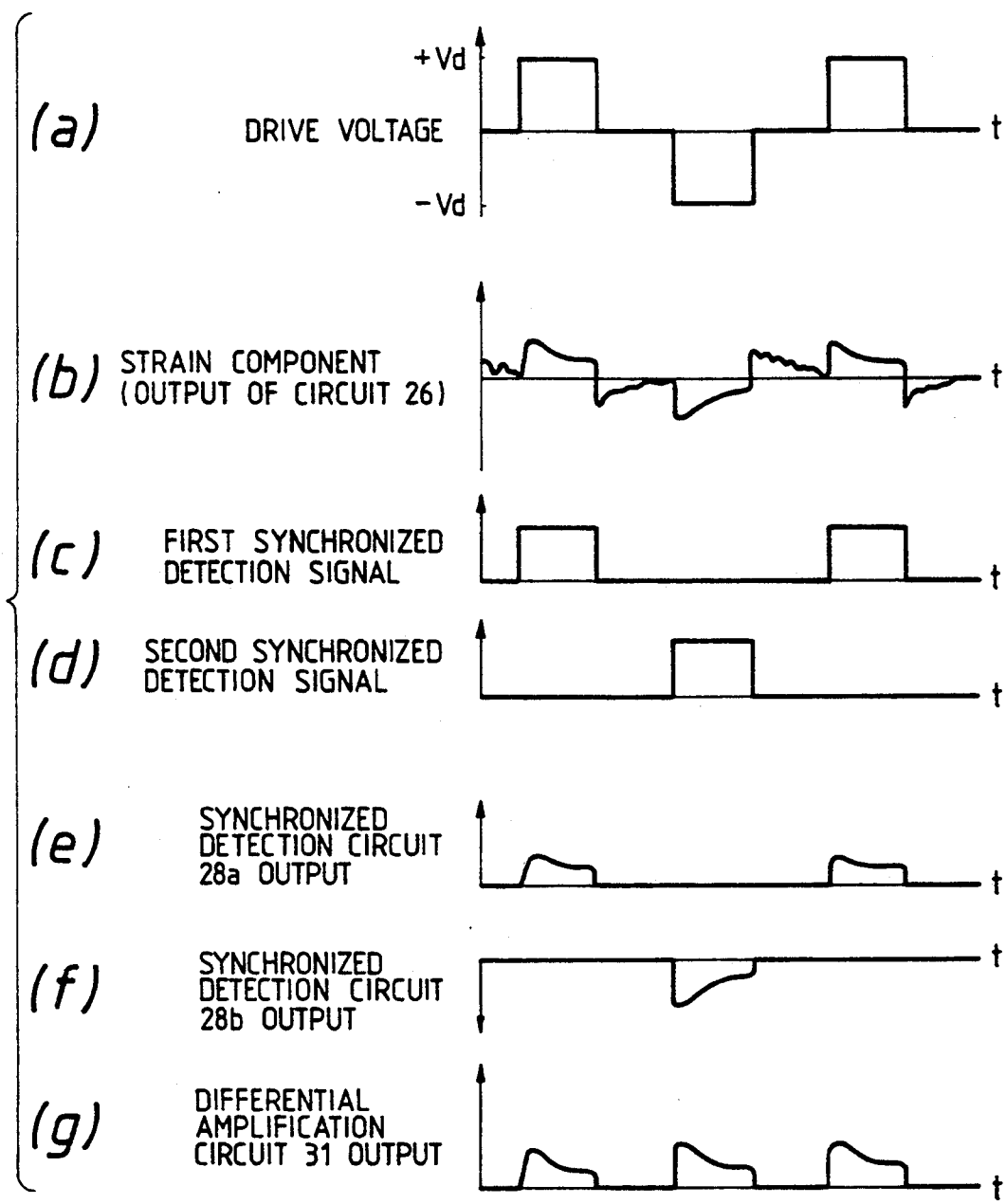
FIGS. 8 (a) to (c) are waveform diagrams of the conventional synchronized detecting circuits shown in FIG. 7 when these circuits are operated.
Figure 18:
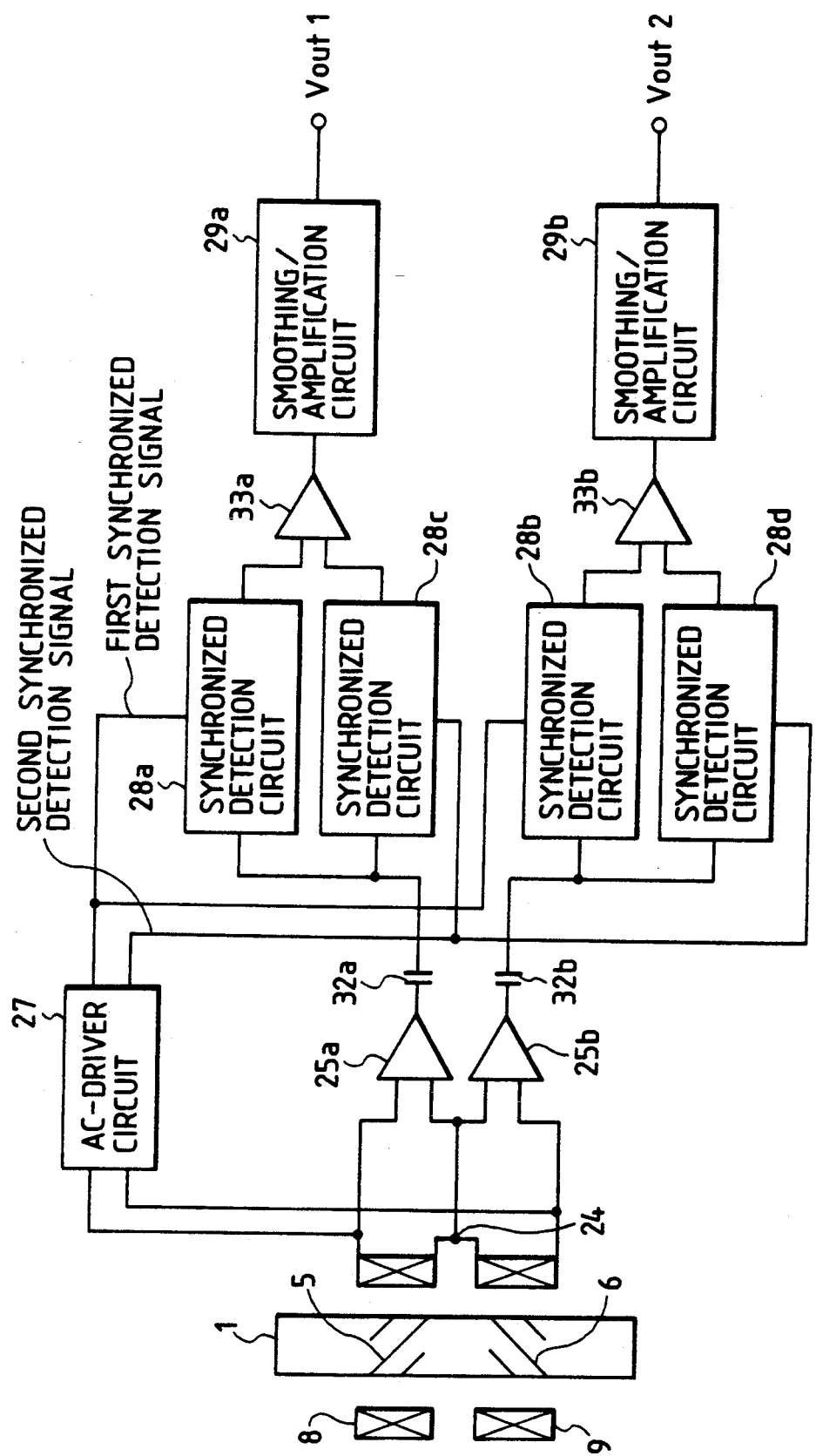
FIGS. 18 and 19 are diagrams showing configurations of strain detectors, which are eighth and ninth embodiments of the invention.

FIG. 18 shows an eighth embodiment of the invention. In this embodiment, an output of the differential amplification circuit 25a is detected by both first and second synchronized detection circuits 28a, 28c using the first and second synchronized detection signals, and the difference between the outputs of the circuits 28a, 28c is amplified by the differential amplification circuit 33a, and smoothed and amplified by the smoothing and amplification circuit 29a to obtain an output $V_{out}1$. Similarly, an output of the differential amplification circuit 25b is detected by both first and second synchronized detection circuits 28b, 28d using the first and second synchronized detection signals, and the difference between the outputs of the circuits 28b, 28d is amplified by the differential amplification circuit 33b, and smoothed and amplified by the smoothing/amplification circuit 29b to obtain an output $V_{out}2$. The positive/negative drive timings of the AC drive circuit 27 are detected by the strain-induced outputs and the difference between detected outputs is amplified as described above. Therefore, the strain detection accuracy can be doubled as in the conventional detector shown in FIG. 7 with an improved resistance to external noise.

Figure 19:
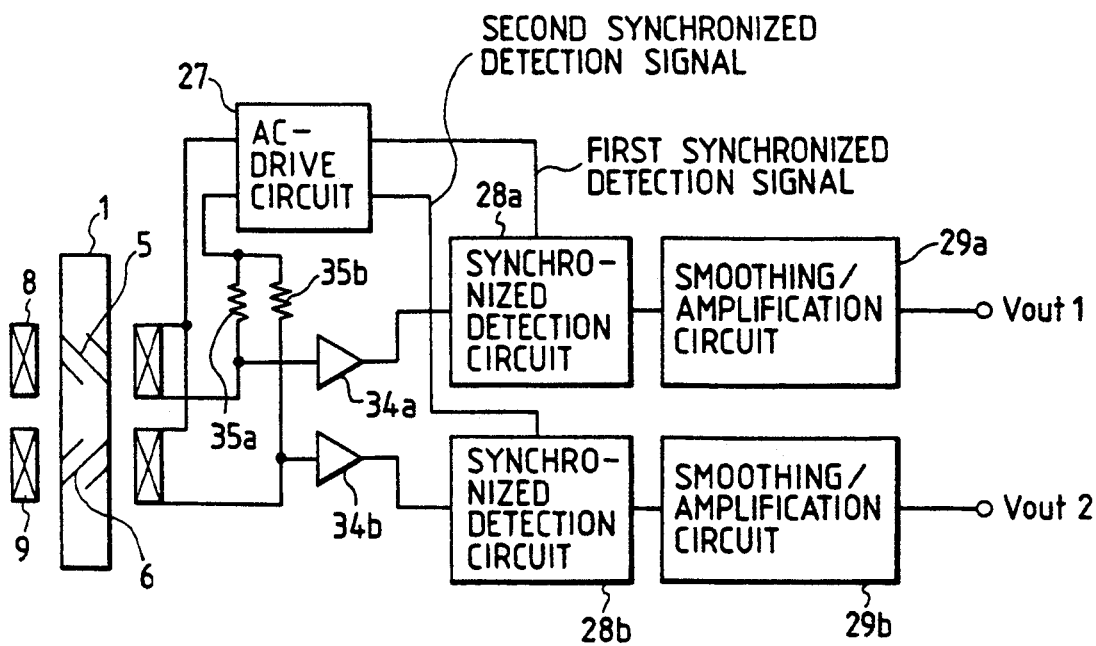
Figure 20:
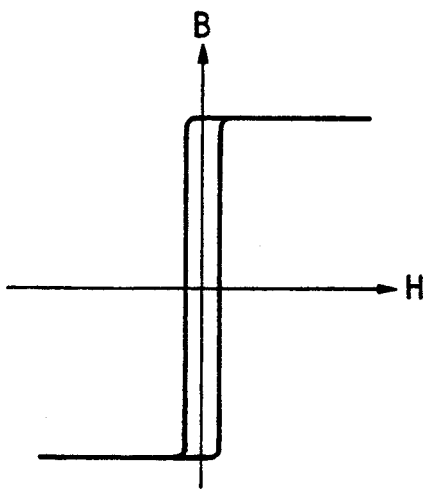
FIG. 20 is a diagram showing the magnetic property of a magnetic layer of the ninth embodiment of the invention.

FIG. 19 shows a ninth embodiment of the invention. Reference numerals 34a, 34b designate amplifiers; and 35a, 35b, current detecting resistors. The detecting coils 8, 9 are connected in parallel to the AC drive circuit 27. In arranging the magnetic layers 5, 6 of this embodiment, one of the following techniques may be employed:

(1) a magnetostrictive material having such a B-H curve as shown in FIG. 20 is directly plated over the driven shaft 1;
(2) the magnetic layers 5, 6 are bonded to the driven shaft 1 with an adhesive whose volume is changed largely by the bonding, and a tensile strain is applied to the magnetic layers 5, 6 thereafter; and
(3) the magnetic layers 5, 6 are bonded to the driven shaft 1 that has been either heated or cooled, and a compressive strain or a tensile strain is then applied to such magnetic layers 5, 6.

Figure 21A:
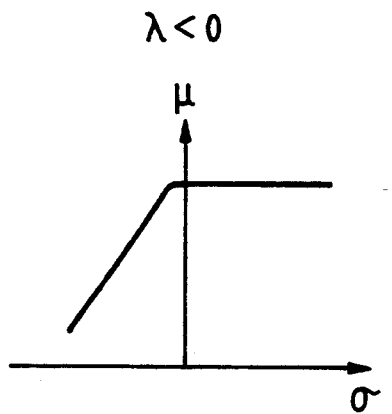
FIGS. 21 (a) and (b) are diagrams showing the permeability of the magnetic layer of the ninth embodiment of the invention.
Figure 21B:
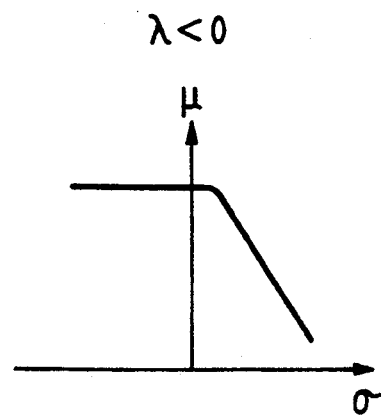
Figure 22:
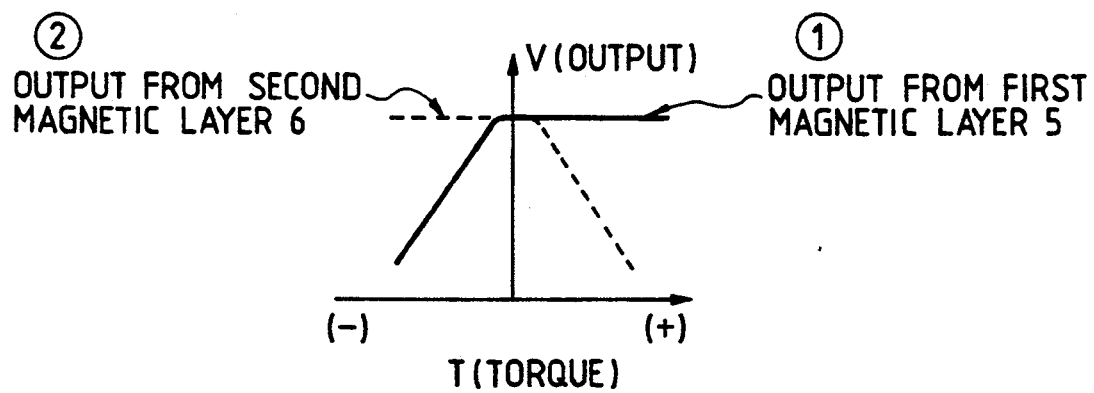
FIG. 22 is a diagram showing the output characteristic of the ninth embodiment of the invention.

In the above construction, if the magnetostrictive coefficient λ of each magnetic layer 5, 6 is greater than 0, then a tensile strength increases its permeability while a compressive stress decreases it. If λ is smaller than 0, a tensile strength decreases its permeability while a compressive stress increases it. Therefore, as long as the permeability of each magnetic layer 5, 6 is initially set to the maximum as shown in FIG. 20, there is no chance of increasing the permeability, allowing it only to decrease. Thus, the relationship between the stress σ and the permeability is such as shown in FIG. 21 (a) if λ>0 and is such as shown in FIG. 21 (b) if λ<0. Hence in this embodiment, the outputs of the magnetic layers 5, 6 relative to an applied torque are as shown in FIG. 22, changing only one output relative to a positive or negative torque.

The detecting coils 8, 9 are connected in parallel to the AC drive circuit 27 in this embodiment. Thus, if a pulse V whose pulse duration is Δt is applied to the detecting coils 8, 9 under the conditions that their inductances are L, their resistances are r, the resistances of the current detecting resistors 35a, 35b are R, and $$\tau \text{ (time constant)} = \frac{L}{R + r}, \text{ then}$$

$$i(t) = \frac{V}{R + r}\left(1 - \frac{1 + e^{-\Delta t/\tau}}{1 + e^{-2\Delta t/\tau}} \cdot e^{-t/\tau}\right)$$

The voltage $E_r(t)$ of the current detecting resistors 35a, 35b becomes $$E_r(t) = \frac{R}{R + r} V \left(1 - \frac{1 + e^{-\Delta t/\tau}}{1 + e^{-2\Delta t/\tau}} \cdot e^{-t/\tau}\right)$$

The voltage E, (t) of the detecting coils 8, 9 becomes $$E_l(t) = \frac{r}{R + r} V + \frac{R}{R + r} V \cdot \frac{1 + e^{-\Delta t/\tau}}{1 + e^{-2\Delta t/\tau}} \cdot e^{-t/\tau}$$

The voltage for smoothing the resistance $V_r$ becomes $$V_r = \frac{R}{R + r} V \cdot \Delta t - \frac{R \cdot L}{(R + r)^2} V \cdot \frac{1 - e^{-2\Delta t/\tau}}{1 + e^{-2\Delta t/\tau}}$$

The smoothing voltage V, on the coil side becomes $$V_l = \frac{r}{R + r} V \cdot \Delta t + \frac{R \cdot L}{(R + r)^2} V \cdot \frac{1 - e^{-2\Delta t/\tau}}{1 + e^{-2\Delta t/\tau}}$$

Therefore, if the voltage of either the detecting coils 8, 9 or the current detecting resistors 35a, 35b is measured, the inductance L corresponding to the applied torque can be detected.

In the aforesaid ninth embodiment, the permeability of each magnetic layers 5, 6 is set to the maximum when no external stress applied thereto, so that the magnetic layers are sensitive to either a tensile stress or a compressive stress. In addition, the detecting coils 8, 9 are connected to the AC drive circuit 27 in parallel with each other, so that only one of the outputs $V_{out}1$, $V_{out}2$ is changed under normal conditions. Thus, the changing of both outputs simultaneously indicates absence of the magnetic layers 5, 6 or circuit abnormalities.

The addition of the synchronized detection circuits 28c, 28d and the differential amplification circuits 33a, 33b to the ninth embodiment shown in FIG. 19 may provide the advantage of doubling the detection accuracy as in the eighth embodiment shown in FIG. 18. Further, the magnetic layers 5, 6 whose magnetic property is set to a condition such as shown in the ninth embodiment may be applied to the seventh and eighth embodiments.

As described in the foregoing, the invention allows two strain detection outputs to be obtained. Thus, by comparing these two outputs, abnormalities of the detection circuits can be detected.

In addition, the permeability of each magnetic layer is initially set to the maximum and thus the permeability can be changed only negatively, thereby allowing only one of the outputs of the magnetic layers to be changed at a time. Such an arrangement allows the outputs to be read independently of each other and thus allows abnormalities in the magnetic layers and the detection circuits to be detected upon detection of two strain outputs simultaneously.

What is claimed is:

1. A strain detector, comprising:
   a driven shaft, said shaft being rotatably mounted so as to rotate when an external torsional force is applied thereto, said driven shaft having an inner portion made of a material having a predetermined heat conductivity and an outer peripheral portion made of a rigid material having a heat conductivity which is lower than said predetermined heat conductivity;
   first and second magnetic layers disposed on said driven shaft, said first and second magnetic layers having a permeability which varies with mechanical strain in said shaft;
   first and second detecting coils disposed around said first and second magnetic layers respectively, said detecting coils being in a noncontact state with said magnetic layers;
   a detection circuit coupled to said detecting coils for detecting electrical signals in said detecting coils, said electrical signals being varied with strain in said shaft due to the varying permeability of said magnetic layers.

2. A detector according to claim 1, said driven shaft further comprising a insulating member, having a heat conductivity which is lower than said predetermined heat conductivity, disposed between two axially displaced portions of said driven shaft.

3. A detector according to claim 1, said detecting means comprising:
   an AC drive circuit electrically connected to said detecting coils for applying an AC voltage to a serially connected body consisting of each of said detecting coils;
   first and second synchronized detection circuits each connected to a respective one of said first and second detecting coils for detecting outputs of said first and second detecting coils in response to first and second synchronized detection signals respectively, said first and second synchronized detection signals being generated in synchronism with positive and negative drive timings of said AC drive circuit, respectively; and
   first and second smoothing/amplification circuits connected to outputs of said first and second synchronized detection circuits respectively for smoothing and amplifying said outputs of said first and second synchronized detection circuits, respectively.

4. A detector according to claim 1, wherein each of said magnetic layers is disposed on said driven shaft so that a magnetic permeability thereof is at a maximum value in the absence of said external torsional force and said detecting means comprises an AC drive circuit electrically connected to said detecting coil for applying an AC voltage to a parallel connected body consisting of said detecting coils which are connected in parallel to each other, first and second synchronized detection circuits each connected to a respective one of said detection coils for detecting outputs of said first and second detecting coils in response to first and second synchronized detection signals, respectively, said first and second synchronized detection signals being generated in synchronism with positive and negative drive timings of said AC drive circuit, respectively and first and second smoothing/amplification circuits connected to outputs of said synchronized detection circuits respectively for smoothing and amplifying outputs of said first and second synchronized detection circuits, respectively.

5. A strain detector as claimed in claim 1, wherein said driven shaft is said heat conductive means.

6. A strain detector, comprising:
   a driven shaft having a first portion and a second portion axially displaced from said first portion, said first and second portions having a predetermined heat conductivity, said shaft being rotatably mounted so as to rotate when an external torsional force is applied thereto, said shaft also having an insulating member disposed between said first and second portions, said insulating member having a heat conductivity which is lower than said predetermined heat conductivity;
   first and second magnetic layers disposed on said shaft, said first and second magnetic layers having a permeability which varies with mechanical strain in said shaft;
   first and second detecting coils disposed around said first and second magnetic layers respectively, said detecting coils being in a noncontact state with said magnetic layers;
   a detection circuit coupled to said detecting coils for detecting electrical signals in said detecting coils, said electrical signals being varied with strain in said shaft due to the varying permeability of said magnetic layers.

7. A strain detector, comprising:
   a driven shaft, said shaft being rotatably mounted so as to rotate when an external torsional force is applied thereto, said driven shaft comprising a hollow heat pipe, both ends of said heat pipe being closed, and an operating liquid being contained within said heat pipe;
   first and second magnetic layers disposed on said shaft, said first and second magnetic layers having a permeability which varies with mechanical strain in said shaft;
   first and second detecting coils disposed around said first and second magnetic layers respectively, said detecting coils being in a noncontact state with said magnetic layers;
   a detection circuit coupled to said detecting coils for detecting electrical signals in said detecting coils, said electrical signals being varied with strain in said shaft due to the varying permeability of said magnetic layers;
   said driven shaft serving as heat conductive means for eliminating temperature differences between said first and second magnetic layers.

8. A strain detector, comprising:
   a driven shaft, said shaft being rotatably mounted so as to rotate when an external torsional force is applied thereto;
   first and second magnetic layers disposed on said shaft, said first and second magnetic layers having a permeability which varies with mechanical strain in said shaft;
   first and second detecting coils disposed around said first and second magnetic layers respectively, said detecting coils being in a noncontact state with said magnetic layers;

a detection circuit coupled to said detecting coils for detecting electrical signals in said detecting coils, said electrical signals being varied with strain in said shaft due to the varying permeability of said magnetic layers;

heat conductive means, having a predetermined heat conductivity, for eliminating temperature differences between said first and second magnetic layers, said heat conductive means being disposed around said shaft, said first and second magnetic layers and said first and second detecting coils.

9. A detector according to claim 8, wherein said driven shaft further comprises an insulating member, having a heat conductivity which is lower than said predetermined heat conductivity, disposed at least at an end thereof between two portions of said driven shaft.

* * * * *